United States Patent Office 3,595,678
Patented July 27, 1971

3,595,678
METHOD OF STABILIZING MAILLARD REACTION PRODUCTS
Hideo Shimazaki and Shuji Tsukamoto, Kanagawa-ken, and Yasushi Komata, Tokyo, Japan, assignors to Ajinomoto Co., Inc., Tokyo, Japan
No Drawing. Filed Dec. 23, 1968, Ser. No. 786,462
Claims priority, application Japan, Dec. 27, 1967, 42/83,843
Int. Cl. A23l 1/26
U.S. Cl. 99—140    4 Claims

ABSTRACT OF THE DISCLOSURE

The product of a Maillard reaction between an amino acid and a hexose or pentose is stabilized by hydrogenation under conditions severe enough to remove aldehyde groups without impairing the flavor or color of the product which make it suitable for use as a food additive.

---

This invention relates to a method of increasing the stability of Maillard reaction products, and more particularly to a method of stabilizing flavor and colour of Maillard reaction products.

It has been known that the products obtained by heating a mixture of an amino acid with a pentose or hexose have a flavour peculiar to the composition and are yellow to brown. Recently, it has been reported that some specific Maillard reaction products could be employed as flavoring or coloring agents in foodstuffs. These Maillard reaction products are of interest to the processed food industry because of their low cost and lack of toxicity.

However, the Maillard reaction products are generally unstable at room temperature. In storage, the flavor is reduced and the colour changes little by little.

It is an object of the present invention to provide a method for improving the storage of Maillard reaction products. According to an aspect of the present invention there is provided a process for stabilizing Maillard reaction products, which comprises hydrogenating the carbonyl compounds including reducing sugars and unsaturated radicals which accelerate the Maillard reaction. By this method, we can stabilize the reaction mixture without impairing its desirable flavor and colour.

The Maillard reaction products are produced by heating one or more amino acids or their salts with one or more pentose or hexose.

Suitable conditions for carrying out the hydrogenation reaction are as follows:

The aqueous solution of Maillard reaction products is adjusted to pH 5.0 to 7.0, preferably pH 6.0 to 6.5, and is poured into an autoclave together with a catalyst. The hydrogenation may be carried out with agitation at a temperature of 50° C. to 150° C. for 20 minutes to 20 hours, at a hydrogen pressure of 20 to 200 kg./cm.$^2$. The preferred range of hydrogen pressure in this reaction is from 50 to 150 kg./cm.$^2$, the preferred temperature is 50 to 150° C., and the preferred reaction time is 2 to 10 hours.

When this reaction is carried out under milder conditions very little hydrogen is absorbed and the effect desired is not achieved. If the conditions for the reaction are more severe than mentioned above, the flavor of the treated Maillard reaction products is impaired, and they cannot be used as food additives.

The catalyst employed for the present invention should reduce at least the aldehyde group of a reducing sugar. Suitable catalysts are Raney nickel, Raney copper, reduced nickel, and reduced copper. The amount of the catalyst may be from 2 to 10% by weight based on the amount of the reactants, preferably from 4 to 5%.

The hydrogenation mixture is filtered and treated with ion exchange resin to remove inorganic ions. The solution obtained is adjusted to 5.0 to pH 6.5, and evaporated to dryness.

EXAMPLE 1

90 grams of L-monosodium glutamate and 30 g. of D-xylose were dissolved in 200 milliliters of water, and the solution was heated at 80° C. for 15 minutes adjusted to pH 5.5 with hydrochloric acid, and hydrogenated with 4 g. of Raney nickel under a pressure of 60 kg./cm.$^2$, at 70° C. for 3 hrs. The dark brown solution obtained was filtered, treated with ion exchange resin IRC–50 to remove metal ions and finally under reduced pressure of 30 mm. Hg at 80° C. The residue, of which colour was yellow and contained 3% unreacted D-xylose. The product had an aroma resembling that of maltol.

EXAMPLE 2

250 ml. of water containing 100 g. of glycine and 60 g. of D-glucose was heated at 100° C. for 15 minutes. 8 g. of Raney copper was added to this solution which was adjusted to pH 6.0. The resulting mix was stirred under a hydrogen pressure of 100 kg./cm.$^2$ at 100° C. for several hours in an autoclave. After being filtered, the brown solution obtained was treated with Dowex-50 to remove metal ions and then, evaporated under a pressure of 30 mm. Hg at 75° C. The residue weighed 135 grams and contained 0.8% unreacted D-glucose.

EXAMPLE 3

150 g. of L-histidine and 140 g. of D-ribose were mixed with 250 ml. of water. This solution was adjusted to pH 9.0 with 2N-NaOH and then stirred about 0.5 hr. at 90° C. After the pH value of the brown solution was adjusted to 6.7 with 2N-HCl at room temperature, 8 g. of Raney nickel was added to it. The resulting mixture was agitated with hydrogen under a pressure of 130 kg./cm.$^2$ at 100° C. for 2.5 hrs., in an autoclave, and was filtered. Water in the reaction mixture was removed in a vacuum at 75~80° C., after removal of metal ions by Dowex-50. The residue had the characteristic odor of a cookie and weighed 250 g.

EXAMPLE 4

50 g. of L-sodium glutamate and 30 g. of D-xylose were dissolved in 200 ml. of water, and the mixture was heated at 80° C. for 15 minutes. The solution was hydrogenated at a pressure of 70 kg./cm.$^2$ at 80° C. for 3 hrs. in the presence of 4 g. of Raney nickel. After filtration, metal ions were removed by means of Dowex-50. 3 grams of the residue prepared from the solution by evaporation at 30 mm. Hg, was dissolved in 150 ml. of water, (Solution A). 200 milliliters of water containing 50 g. of mono sodium glutamate and 30 g. of D-xylose was heated at 80° C. for 1.5 hrs., the solution was evaporated as mentioned above, and 3 g. of the dry residue were dissolved in 150 ml. of water, (Solution B). The solutions A and B were distributed in five test-tubes each. These test tubes were allowed to stand in an oil bath at 90° C. The optical density determined at 430 m$\mu$ of solutions A and B was estimated at the times indicated in Table 1.

The data of Table 1 indicates that solution A was more stable than solution B.

TABLE 1

| Time (min.) | 0 | 30 | 60 | 120 | 180 |
|---|---|---|---|---|---|
| Sample: | | | | | |
| Solution A | 155 | 154 | 215 | 224 | 224 |
| Solution B | 128 | 142 | 215 | 243 | 520 |

EXAMPLE 5

50 grams L-sodium of aspartate and 30 g. of D-xylose were dissolved in 200 ml. of water, and then the mixture was heated at 80° C. for 20 minutes. The solution was adjusted to pH 8.0 with 2N-NaOH.

The solution was hydrogenated at a pressure of 70 kg./cm.$^2$ at 80° C. for 3 hrs. with 4 g. of Raney nickel. After filtration, metal ions were removed by Dowex-50. The resulting solution was evaporated at 25 mm. Hg at 80° C. (A residue).

50 grams L-sodium of aspartate and 30 g. of D-xylose were dissolved in 200 ml. of water, and then the mixture was heated at 80° C. for 40 minutes after being adjusted to pH 9.0. The resulting brown solution was evaporated at a pressure of 25 mm. Hg at 80° C. (B residue). Both residues were allowed to stand in chambers which were controlled at elevated humidities as listed in Table 2, for 24 hrs. at room temperature, and the weight increase of the samples was determined, as shown in Table 2. It is apparent from the table that residue A is more stable than residue B.

TABLE 2
Weight increase, percent

| Humidity, percent | 36 | 46 | 67 | 88 |
|---|---|---|---|---|
| Sample: | | | | |
| A | 4.27 | 5.43 | 11.3 | 14.7 |
| B | 5.16 | 6.78 | 16.5 | 21.6 |

What we claim is:

1. A method of improving the stability of a Maillard reaction product which comprises hydrogenating said product with hydrogen at a pressure of 20 to 200 kg./cm.$^2$ and a temperature of 50 to 150° C. for 20 minutes to 20 hours in the presence of a hydrogenation catalyst.

2. A method as set forth in claim 1, wherein said product is prepared by heating an amino acid with a pentose or hexose in aqueous solution.

3. A method as set forth in claim 1, wherein said product is prepared by heating in aqueous solution a mixture selected from the group consisting of glutamic acid and xylose, glycine and glucose, histidine and ribose, or aspartic acid and xylose.

4. A stabilized Maillard reaction product prepared by the method of claim 1.

References Cited

UNITED STATES PATENTS 2,989,569  6/1961  Apel _____ 127—37X
3,060,031  10/1962  Moriarty _____ 99—140X

OTHER REFERENCES

H. M. Barnes et al., Ind. and Eng. Chem., 39, 1167–70 (1947).

MORRIS O. WOLK, Primary Examiner

S. MARANTZ, Assistant Examiner

U.S. Cl. X.R.

260—690